United States Patent [19]

Tebben et al.

[11] 4,014,819
[45] Mar. 29, 1977

[54] NICKEL CATALYST

[75] Inventors: Johannes H. Tebben, Maastricht; Cornelis A. M. Weterings, Stein, both of Netherlands

[73] Assignee: Stamicarbon B.V., Geleen, Netherlands

[22] Filed: Nov. 26, 1974

[21] Appl. No.: 527,284

[30] Foreign Application Priority Data

Nov. 28, 1973 Netherlands ............ 7316234

[52] U.S. Cl. ............................................ 252/459
[51] Int. Cl.² ...................................... B01J 29/10
[58] Field of Search ....................... 252/459, 452

[56] References Cited

UNITED STATES PATENTS 3,668,148  6/1972  Van Beek et al. ........... 252/459 X

Primary Examiner—Carl F. Dees
Attorney, Agent, or Firm—Cushman, Darby & Cushman

[57] ABSTRACT

The invention is directed to precipitating soluble nickel salts onto catalyst carriers by the addition of urea and reducing the insoluble nickel salt to the free metal to form catalyst-carrier compositions of high specific metal catalyst area wherein the amount of urea added satisfies the following equation $$U = f \sqrt{Ni} \qquad (1)$$

where:
U = urea concentration in grams per liter;
Ni = nickel ions concentration in grams per liter of water;
f = a factor varying between 75/pH and 175/pH, in which pH = the pH value of the suspension of the silica in the water.

10 Claims, 1 Drawing Figure

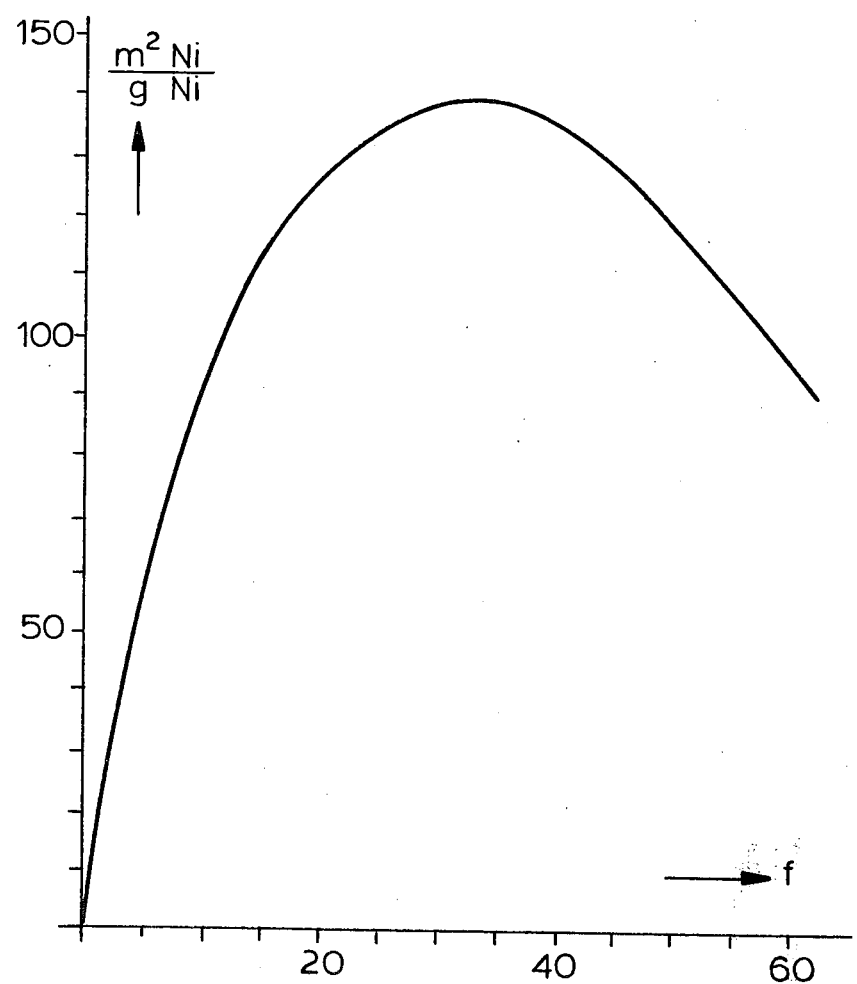

NICKEL CATALYST

BACKGROUND OF THE INVENTION

In accordance with the invention, it has been discovered that optimum specific surface areas of the metal catalyst deposited on any silica carrier and small particle sizes of the metal catalyst are obtained when urea is employed in predetermined amounts to generate hydroxyl ions in the process comprising (1) increasing the hydroxyl ion concentration of a mixture of silica in water and a water soluble salt of the metal catalyst to precipitate insoluble salts of the metal catalyst on the silica, with agitation at temperatures above 50° C.; and (2) reducing the insoluble salt of the metal catalyst to produce free metal catalyst deposited on the silica carrier. Optimum specific surface areas of the metal catalyst deposited on the silica carrier and small particle sizes of the metal catalyst are obtained when the predetermined amount of urea satisfies the equation.

$$U = f \sqrt{Ni} \qquad (1)$$

where:
$U$ = urea concentration in grams per liter;
$Ni$ = nickel ions concentration in grams per liter of water; $f$ = a factor varying between 75/pH and 175/pH, in which pH = the pH value of the suspension of the silica in the water.

Various silica carriers are marketed commercially. Specific silicas have specific properties. In particular, specific silicas may have characteristics pHs. For instance, the pH of AEROSIL (trade name for silicon dioxide obtained by flame-hydrolysis of silicon chloride) is about 3.5. The pH of Ketjensil (trade name for silicon dioxide obtained by subjecting water glass to neutralization with sulfuric acid and, subsequently, to spray-drying) is about 6.5. The pH of Kieselguhr, varies with kind and with source, from a pH of about 3.8 to 8.5.

In turn, the size of the specific areas of catalyst metals deposited on silicas, and particle sizes, depend on the nature of the silica carrier employed. The amount of urea used to act as a source of hydroxyl ions, when used in a process comprising increasing the hydroxyl ion concentration of a mixture of silica in water and a water soluble salt of the metal catalyst to precipitate an insoluble salt of the metal catalyst on the silica, must be determined empirically.

DETAILED DESCRIPTION OF THE INVENTION

In accordance with the invention, a composition comprising a catalyst deposited on a carrier, may be formed which has high specific metal catalyst surface areas, about 120 to 180 m²/g and characterized by small particle size of the metal catalyst. It is possible in accordance with the invention to obtain a nickel catalyst deposited on carrier which has a specific nickel surface area of around 140 m²/g and a nickel particle size of only 20 to 50 A-units.

It has been discovered that when predetermined amounts of urea are employed as a source of hydroxyl ions, in a process comprising (1) increasing the hydroxyl ion concentration of a mixture of silica in water and a water soluble salt of a metal catalyst to precipitate the insoluble salt of the metal catalyst onto the silica support, (2) reducing the insoluble salt of the metal catalyst to produce the free metal catalyst deposited on the carrier, the aforementioned advantages may be attained. Particularly, when the predetermined amount of urea satisfies the equation $$U = f \sqrt{Ni} \qquad (1)$$

where:
$U$ = urea concentration in grams per liter;
$Ni$ = nickel ions concentration in grams per liter of water;
$f$ = a factor varying between 75/pH and 175/pH, in which pH = the pH value of the suspension of the silica in the water.

High specific metal catalyst surface areas in small particle sizes of the metal catalyst on the carrier are obtained. As can be seen, from the amount of urea is dependent, not only on the nickel concentration, but is also dependent on the pH value of the suspension of the silica in water, and thus the pH value of the suspension of the silica in water must be predetermined.

The first step of the process of the invention comprises forming a mixture of a water soluble catalyst metal salt in water in the presence of a silica (silicon dioxide) carrier. In fact, any silica carrier, known in the art, may be used. The pH of the suspension of silica in water, in the absence of the catalyst metal salt, must be either known or predetermined by measuring the pH of the suspension of the silica in water.

The amount of soluble salt of the metal catalyst is not critical. However, the quantity of the soluble salt of the catalyst metal must be predetermined. By predetermined amounts of soluble metal catalyst is meant such a quantity of the soluble salt of the metal catalyst is to be used so as to reach the desired degree of loading of the silica. Any soluble salts of the metal catalyst may be employed. Generally, the prior art recognizes nitrates of catalyst salts as convenient soluble salts of metal catalysts. When the ultimate product is to be a nickel catalyst deposited on a silica carrier, usually the soluble salt is nickel nitrate.

In accordance with the invention, urea is added to a mixture of a suspended silica in a water solution of a soluble salt of the metal catalyst. As set forth above, the amounts of urea are added to satisfy equation (1). The amount of urea is dependent on the nickel ion concentration and on the pH value of the suspension of silicate in water. Thus, the pH value of the suspension of silica in water must be predetermined, prior to mixing the suspension of silica in water with the soluble salt of the metal catalyst. The pH value of the silica suspension in water may be predetermined by measuring the pH value by known prior art techniques, including reagents and pH meters.

The process comprises forming the mixture of the suspended silica carrier in water containing the water soluble salt of the metal catalyst, adding the urea, and heating the suspension/solution with stirring, to temperatures above 50° C. Temperatures may range between 90° to 110° C., during the precipitation. Generally, temperatures of approximately of 100° C. are employed. Precipitation of the insoluble metal catalyst salt usually requires several hours, sometimes up to 20 hours. If precipitation is undertaken by the "deposition precipitation" method, according to Ser. No. 361,492 which is incorporated herein by reference, a day or two may be required for complete precipitation.

After precipitation of the insoluble salt of the metal catalyst onto the silica carrier, the insoluble metal salt on the carrier is reduced to the free metal. In order to reduce the insoluble salt of the metal catalyst to the free metal, the precipitate resulting from the precipitation step, is separated from the solution. Separation may be by filtration or by any known prior art method. When separation is by filtration, the precipitate recovered from the filtrate or supernatant liquid, is washed. Washing removes inorganic impurities from the composition comprising the insoluble metal catalyst salt deposited on the carrier. Thereafter, the composition resulting from the precipitation step is dried. Drying may be effected at elevated temperatures, or under vacuum, or at elevated temperatures under vacuum.

Reduction of the insoluble salt on the carrier may be undertaken by any known methods. Conveniently, reduction may be undertaken by hydrogenation of the insoluble metal catalyst salt deposited on the carrier at elevated temperatures. Particularly, temperatures may range from 350° to 500° C.

DESCRIPTION OF THE DRAWINGS

The invention may be more fully understood by the graph set forth in the drawings. The results which are tabulated in the graph represent a series of experiments. The series of experiments undertaken to obtain the results set forth in the graph included the following parameters: 3 liters of water were employed and were used to suspend AEROSIL. The pH value of the suspension was invariably 3.5. Different nickel ion concentrations and different urea concentrations were employed. Addition of urea was made to precipitate insoluble nickel compounds, under conditions including stirring and heating the suspension/solution at approximately 100° C. The Ni (II) - SiO$_2$ ratio was varied from 1:2 to 2:1. After the nickel compound had been precipitated on the carrier, the loaded carrier was separated from the liquid, washed, dried and reduced in a hydrogen flow at 450° C. for 16 hours. The nickel surface area in m$^2$/g of Ni of the nickel metal, was then determined. The nickel surface area in m$^2$/g of Ni of the nickel metal was then determined by hydrogen absorption at room temperature after degassing the reduced catalyst mass at 400° to 450° C.

The results of the test series are set forth in the graph. The factor f is plotted on the horizontal axis. The value of this factor f follows from the formula (1) as $$\sqrt{\frac{U^2}{Ni}}$$

On the vertical axis, the nickel surface area in m$^2$/g of Ni is plotted. The graph shows the maximum nickel surface area of about 140 m$^2$/g at f equals about 36. For AEROSIL the graph also shows that at a variation of f within the range of from 21.5 = 75/pH to 50 - 175/pH the nickel surface area does not essentially decrease in size.

The corresponding graph can be made for other silica carriers, which will show that an optimum nickel surface area is invariably obtained between the limits of the factor f ranging from 21.5 to 50.

Thus, a method of preparing catalyst compositions which satisfies the objects, aims and advantages set forth above has been discovered. The invention is not to be limited to the aforementioned embodiments, but rather, all alternatives, advantages and modifications, known in the prior art, are to be encompassed by the appended claims.

What is claimed is:

1. A process for preparing a nickel catalyst which is precipitated on a silica carrier, wherein the specific nickel surface area is between 120 and 180 m$^2$/g, comprising measuring the pH of a mixture of a silica carrier in water; adding, with stirring, (1) a water soluble salt of nickel to the mixture and (2) urea to precipitate a composition comprising the insoluble nickel salt deposited on said carrier, at temperatures above 50° C.; and reducing said composition to form a metal catalyst deposited on said carrier; wherein the amount of urea added to the mixture of silica, water and water soluble nickel salt, satisfies the equation $$U = f \sqrt{Ni} \qquad (1)$$

where:
U = urea concentration in grams per liter;
Ni = nickel ions concentration in grams per liter of water;
f = a factor varying between 75/pH and 175/pH, in which
pH = the pH value of the suspension of the silica in the water.

2. The process of claim 1, wherein f equals 21.5 to 50.

3. The process of claim 1, wherein precipitation of said insoluble nickel salt is undertaken at temperatures between 90° to 110° C.

4. The process of claim 1, wherein the reducing step comprises hydrogenating said insoluble nickel salt to form the free nickel metal deposited on the carrier at temperatures ranging from about 350° to 500° C.

5. In a process for precipitating catalyst on silica carriers, comprising increasing the hydroxyl ion concentration of a mixture of silica in water and a water soluble salt of a catalyst metal, to precipitate the insoluble salt of the catalyst metal onto the silica with aggitation at temperatures above 50° C.; and reducing the insoluble salt of the catalyst metal to produce the metal catalyst deposited on the silica carrier, the improvement comprising adding an amount of urea as a source of said hydroxyl ions to precipitate said insoluble salt, said amount of urea satisfying the equation $$U = f \sqrt{Ni} \qquad (1)$$

where:
U = urea concentration in grams per liter;
Ni = nickel ions concentration in grams per liter;
f = a factor varying between 75/pH and 175/pH, in which pH = the pH value of the suspension of the silica in the water.

6. The improvement of claim 5, which comprises measuring the pH of a mixture of water and suspended silica; dissolving the soluble salt of the catalyst metal in said mixture, and then adding said urea.

7. The process of claim 5, wherein the catalyst metal is nickel.

8. The process of claim 6, wherein precipitation of said insoluble salt is undertaken at temperatures ranging between 90° and 110° C.

9. The process of claim 7, wherein f ranges approximately from 21.5 to 50.

10. The process of claim 2, wherein precipitation of said insoluble nickel salt is undertaken at temperatures between 90° to 110° C.

* * * * *